(12) United States Patent
Ishikawa et al.

(10) Patent No.: US 7,071,618 B2
(45) Date of Patent: Jul. 4, 2006

(54) ELECTROLUMINESCENT ELEMENT COMPRISING ELECTRICALLY COUPLED SHIELD LAYER

(75) Inventors: Takayuki Ishikawa, Fukui (JP); Masatoshi Takenaka, Fukui (JP); Tetsuro Hanahara, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 155 days.

(21) Appl. No.: 10/790,034

(22) Filed: Mar. 2, 2004

(65) Prior Publication Data
US 2004/0212299 A1 Oct. 28, 2004

(30) Foreign Application Priority Data
Mar. 3, 2003 (JP) .............................. 2003-055532

(51) Int. Cl.
*H05B 33/00* (2006.01)
(52) U.S. Cl. .................. 313/509; 313/506; 313/352
(58) Field of Classification Search ............... 313/506, 313/509, 512, 500, 505, 239, 240, 313, 326, 313/352; 315/169.3; 428/690, 917
See application file for complete search history.

(56) References Cited

U.S. PATENT DOCUMENTS 4,617,195 A * 10/1986 Mental ........................ 427/66
5,585,695 A * 12/1996 Kitai .......................... 313/506

FOREIGN PATENT DOCUMENTS

JP 9-283278 10/1997

* cited by examiner

*Primary Examiner*—Ashok Patel
(74) *Attorney, Agent, or Firm*—Wenderoth, Lind & Ponack, L.L.P.

(57) ABSTRACT

An EL element includes a) an outer connecting part, b) a substrate comprising a light-transmitting and insulating sheet, c) a light-transmitting electrode layer formed on the substrate wholly or except the outer connecting part in a specific pattern, d) a light emitting layer formed on the light-transmitting electrode layer in a specific pattern, e) a dielectric layer formed on the light emitting layer in a specific pattern, f) a backside electrode layer formed on the dielectric layer in a specific pattern, g) an insulating layer formed on the backside electrode layer and the light-transmitting electrode layer except the outer connecting part, and h) a shielding layer formed on the insulating layer in a specific pattern. The light-transmitting electrode layer or the backside electrode layer is coupled with the shielding layer. The EL element is thus arranged so that it can have its outer connecting part of a reduced size, and so that coupling with the electronic device becomes easy.

18 Claims, 6 Drawing Sheets

ELECTROLUMINESCENT ELEMENT COMPRISING ELECTRICALLY COUPLED SHIELD LAYER

BACKGROUND OF THE INVENTION

1. Field of the Invention

The present invention relates to an electroluminescent element used for illumination of a display unit, a controlling unit or the like of various electronic devices.

2. Background Art

Recently, in various electronic devices, and particularly portable terminal devices such as portable telephones, an electroluminescent element (EL element) emits light by using a small IC-drive inverter or the like so that a display unit such as an LCD or a controlling unit such as a push button is illuminated for recognition or operation in a dark place.

According to the conventional EL element, a shield plate is formed at the EL element itself or between the EL element and a circuit of an electronic device, and connected with a ground terminal to prevent electromagnetic noise which is generated from the inverter or the like and causes incorrect operation of the device (for example, see Japanese Patent Unexamined Publication H09-283278).

The conventional EL element is described hereinafter with reference to FIG. 6.

FIG. 6 is a sectional perspective view of the conventional EL element. Various layers are deposited on an upper surface of a light-transmitting substrate 1 such as a film so as to form the EL element. In FIG. 6, a light-transmitting electrode layer 4 made of indium-tin oxide (referred to as "In-Tin Oxide" or "ITO") or the like is formed on the upper surface of substrate 1 by using a sputtering method, an electron beam method or the like. A bus electrode 2 is formed on the upper surface of substrate 1 so as to be connected with light-transmitting electrode layer 4, and an electrode terminal 2A extends from bus electrode 2 to a tail portion 3 of substrate 1.

A light emitting layer 5, a dielectric layer 6 and a backside electrode layer 7 are printed on light-transmitting electrode layer 4 in this order sequentially, and are covered with an insulating layer 8. Phosphors such as zinc sulfide (ZnS) or the like, which are base materials of luminousness, are dispersed in synthetic resin, thereby forming light emitting layer 5. Ferroelectric materials such as barium titanate ($TiBa_3$) or the like are dispersed in synthetic resin, thereby forming dielectric layer 6. Backside electrode layer 7 is formed of an electric conductor such as silver or carbon resin.

In addition, a shielding layer 9 made of an electrical conductor such as silver or carbon resin is printed on insulating layer 8. An electrode terminal 7A of backside electrode layer 7 and an electrode terminal 9A of shielding layer 9 extend to tail portion 3, so that the EL element is constructed.

The EL element discussed above is intended to be placed at the back of an LCD, a push button or the like, and mounted to an electronic device. Electrode terminal 2A of bus electrode 2, electrode terminal 7A and electrode terminal 9A, all of which are formed on tail portion 3, are connected with the IC-drive inverter (not shown) or the like of an electronic circuit provided for the electronic device by using a connector or the like.

AC voltage is supplied from the inverter or the like at the electronic device, and applied via electrode terminal 2A and electrode terminal 7A to light-transmitting electrode layer 4, which is connected to bus electrode 2, and backside electrode layer 7. Then phosphors in light emitting layer 5 emit light and illuminate the display unit or the controlling unit of the electronic device from its back, so that the display unit or the controlling unit can be recognized even in a dark place.

Electrode terminal 9A is constructed to prevent electromagnetic noise generated from the inverter or the like for driving the EL element by using shielding layer 9 which is connected with the ground terminal of the electronic device, so that incorrect operation of the electronic device is prevented.

However, according to the conventional EL element, three electrode terminals (i.e., electrode terminal 2A, electrode terminal 7A and electrode terminal 9A) have to be connected with the electronic circuit of the electronic device, where electrode terminal 2A is connected with bus electrode 2 and light-transmitting electrode layer 4, electrode terminal 7A is connected with backside electrode layer 7 and electrode terminal 9A is connected with shielding layer 9. Therefore, tail portion 3 to which these three electrode terminals extend becomes large and a large connector for connecting therewith is required.

The present invention is directed to provide an EL element which is capable of reducing a size of the tail portion and which can be easily connected with the electronic device.

SUMMARY OF THE INVENTION

An EL element of the present invention includes the following components:

a) an outer connecting part, b) a substrate comprising a light-transmitting and insulating sheet, c) a light-transmitting electrode layer formed on the substrate in a specific pattern, so as to cover substantially all of the substrate or so as to cover substantially all of the substrate except the outer connecting part, d) a light emitting layer formed on the light-transmitting electrode layer in a specific pattern, e) a dielectric layer formed on the light emitting layer in a specific pattern, f) a backside electrode layer formed on the dielectric layer in a specific pattern, g) an insulating layer formed on the backside electrode layer and the light-transmitting electrode layer except the outer connecting part, and h) a shielding layer formed on the insulating layer in a specific pattern.

The light-transmitting electrode layer or the backside electrode layer is coupled with the shielding layer.

A non-luminous part, where the light emitting layer, the dielectric layer and the backside electrode layer are not formed, is formed on a peripheral part of the substrate. A hole, which penetrates to the light-transmitting electrode layer, is formed at the insulating layer at the non-luminous part. A connecting portion is formed at the hole by using conductive material so as to couple the light-transmitting electrode layer with the shielding layer.

According to another structure of the present invention, a hole, which penetrates to the light-transmitting electrode layer, is formed at the insulating layer at a luminous part, where the light emitting layer, the dielectric layer and the backside electrode layer are formed. An inner periphery of the hole is covered with insulating material, and a connecting portion is formed at the hole by using conductive material so as to couple the light-transmitting electrode layer with the shielding layer.

According to still another structure of the present invention, a hole, which penetrates to the backside electrode layer, is formed at the insulating layer at the luminous part, where the light emitting layer, the dielectric layer and the backside electrode layer are formed. A connecting portion is formed at the hole by using conductive material so as to couple the backside electrode layer with the shielding layer.

According to the present invention, the shielding layer and the connecting portion may be formed of substantially an identical conductive material.

According to yet another structure of the present invention, the outer connecting part protrudes from a main part of the substrate, and electrode terminals extend from the light-transmitting electrode layer and the backside electrode layer to the outer connecting part.

Using the structure discussed above, only two electrode terminals extend from the light-transmitting electrode layer and the backside electrode layer to a tail portion (i.e., the outer connecting part). Therefore, the EL element can be provided with a tail portion of reduced size and can be easily coupled with the electronic device.

In addition, according to the EL element of the present invention, the second insulating layer covers an upper surface of the shielding layer. Using this structure, the second insulating layer acts as a protective film, so that the shielding layer is prevented from being damaged while the EL element is conveyed or mounted to an electronic device. Besides, this structure provides electrical insulation against other electronic components in the electronic device.

As discussed above, the present invention provides the EL element which can have its tail portion of a reduced size and which can be easily coupled with the electronic device, where the tail portion acts as the outer connecting part to be coupled with the electronic device.

DETAILED DESCRIPTION OF THE INVENTION

An exemplary embodiment of the present invention is demonstrated hereinafter with reference to the accompanying drawings.

In these drawings, elements similar to those described in the Background Art have the same reference marks, and the descriptions of those elements are omitted here.

Exemplary Embodiment

Figure 1:
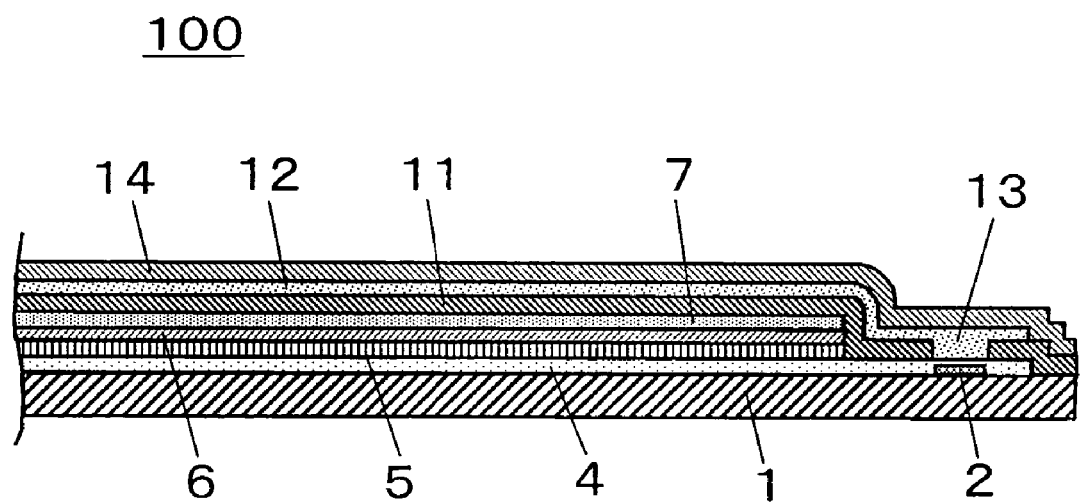
FIG. 1 is a sectional view of an EL element in accordance with an exemplary embodiment of the present invention.
Figure 2:
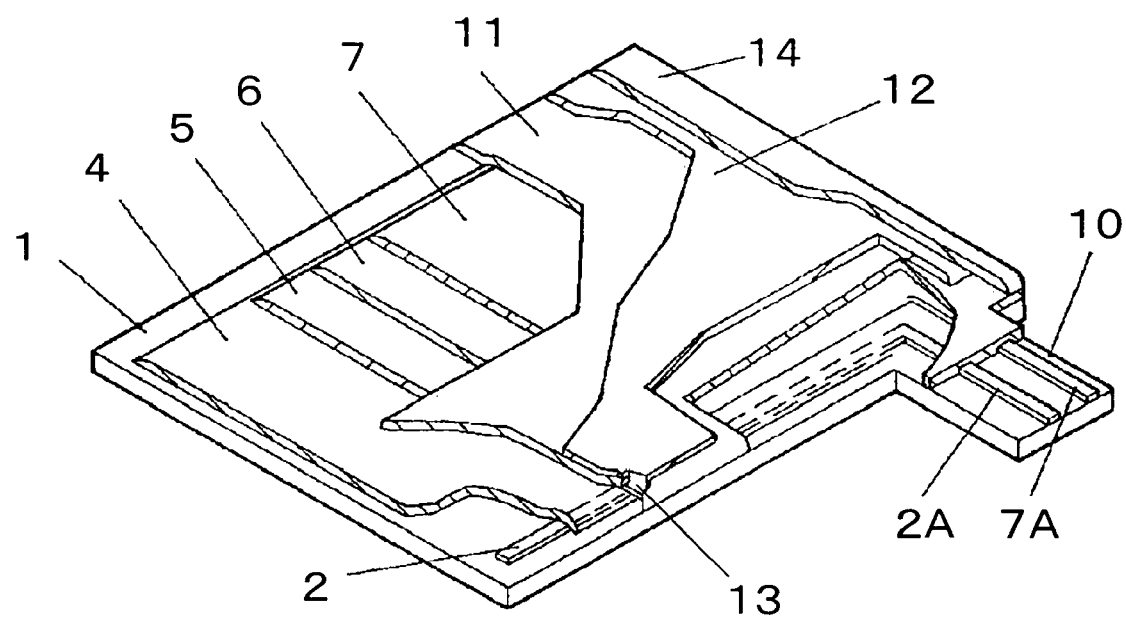
FIG. 2 is a partially cut-away perspective view of the EL element in accordance with the exemplary embodiment of the present invention.

FIG. 1 is a sectional view of an EL element 100 in accordance with an exemplary embodiment of the present invention. FIG. 2 is a partially cut-away perspective view of the EL element in accordance with the exemplary embodiment of the present invention.

In the present invention, various layers are formed on an upper surface of a light-transmitting substrate 1 so as to construct the EL element. As shown in FIGS. 1 and 2, a light-transmitting electrode layer 4 is formed on the upper surface of substrate 1. Substrate 1, made of light-transmitting insulating material, has a substantially rectangular shape as a main part, and has a tail portion 10 which acts as an outer connecting part. Substrate 1 is formed of a thin glass sheet or a resinous film such as polyethylene-terephthalate (PET). Light-transmitting electrode layer 4 is formed on substrate 1 wholly or in a specific pattern by depositing indium-tin oxide (ITO) using a sputtering method, an electron beam method or the like, or by printing using paste made of conductive resin such as polyethylene-dihydroxy-thiophene.

A bus electrode 2 is formed on an upper surface of rectangular substrate 1 so as to be adjacent to and parallel to one side of substrate 1. In addition, bus electrode 2, which is made of conductive material having low resistance, is connected with light-transmitting electrode layer 4. An electrode terminal 2A extends from bus electrode 2 to tail portion 10 which is on the same plane with substrate 1 is protruded from a part of substrate 1, and acts as the outer connecting part.

A light emitting layer 5, a dielectric layer 6 and a backside electrode layer 7 are applied on light-transmitting electrode layer 4 in a specific pattern in this order sequentially, and covered with an insulating layer 11. Phosphors such as zinc sulfide (ZnS) or the like, which are base materials of luminousness, are dispersed in synthetic resin such as fluorine rubber, thereby forming light emitting layer 5. Ferroelectric materials such as barium titanate ($TiBa_3$) or the like are dispersed in synthetic resin, thereby forming dielectric layer 6. Backside electrode layer 7 is formed by dispersing electric conductors such as silver or carbon in resin. Insulating layer 11, formed of a material such as epoxy resin or polyester resin, covers these layers mentioned above except at the tail portion 10 which acts as the outer connecting part. Insulating layer 11 has a hole, which penetrates to light-transmitting electrode layer 4, over a part of bus electrode 2. Electrode terminal 7A extends parallel with electrode terminal 2A from backside electrode layer 7 to tail portion 10.

A shielding layer 12, where electric conductors such as silver or carbon are dispersed in resin, is formed on insulating layer 11. By forming shielding layer 12, a connecting portion 13, where electric conductors such as silver or carbon are dispersed in resin, is formed at the hole. As discussed above, the hole has been formed at a peripheral part of insulating layer 11 and over the part of bus electrode 2 which is adjacent to and parallel to one side of substrate 1. As a result, shielding layer 12, which is formed on insulating layer 11, is coupled with light-transmitting electrode layer 4 via connecting portion 13. In other words, shielding layer 12 is coupled (hereinafter referred to as "through-hole coupled") with bus electrode 2 connected with light-transmitting electrode layer 4. A second insulating layer 14, formed of a material such as epoxy resin or polyester resin, covers shielding layer 12 except at tail portion 10, so that the EL element of the present invention is constructed.

As discussed above, according to the EL element of the present invention, shielding layer 12 is coupled with bus electrode 2 via a connecting portion 13, so that only two electrode terminals (i.e., electrode terminal 2A coupled with bus electrode 2 and electrode terminal 7A) extend to tail portion 10 which acts as the outer connecting part.

According to the embodiment mentioned above, the hole, which penetrates to light-transmitting electrode layer 4, is formed over bus electrode 2 so as to form connecting portion 13. However, the present invention is not limited to the EL element mentioned above. The significant feature of the present invention is that the hole for forming connecting portion 13 is formed in insulating layer 11 at a non-luminous part, where light emitting layer 5, dielectric layer 6 and backside electrode layer 7 are not formed, of a peripheral part of substrate 1. In addition, the hole penetrates to light-transmitting electrode layer 4.

Besides, according to the embodiment mentioned above, although substrate 1 has a substantially rectangular shape as a main part, the EL element of the present invention is not limited to this shape, and other shapes or structures may be used as substrate 1.

The EL element discussed above is intended to be placed at the back of an LCD, a push button or the like, and mounted to an electronic device. Electrode terminal 2A of bus electrode 2 and electrode terminal 7A, both of which are formed at tail portion 10, are coupled with the IC-drive inverter (not shown) or the like of an electronic circuit provided at the electronic device by using a connector or the like. Thus, electrode terminal 2A is coupled with a ground terminal, and electrode terminal 7A is coupled with a power source terminal.

AC voltage is supplied from the inverter or the like at the electronic device and applied via electrode terminal 2A and electrode terminal 7A to light-transmitting electrode layer 4, which is coupled with bus electrode 2, and backside electrode layer 7. Then phosphors in light emitting layer 5 emit light and illuminate a display unit or a controlling unit of the electronic device from its back, so that the display unit or the controlling unit can be recognized even in a dark place.

In addition, shielding layer 12 is coupled with bus electrode 2 via connecting portion 13, thereby being electrically coupled with the ground terminal of the device. By using shielding layer 12, electromagnetic noise generated from the inverter or the like for driving the EL element is blocked, so that incorrect operation of the electronic device is prevented.

As discussed above, according to the present invention, light-transmitting electrode layer 4 and shielding layer 12 are through-hole coupled with each other via connecting portion 13, where electric conductors such as silver or carbon are dispersed in the resin in the hole formed in insulating layer 11. Therefore, only two electrode terminals (i.e., electrode terminal 2A coupled with light-transmitting electrode layer 4 and electrode terminal 7A coupled with backside electrode layer 7) extend to tail portion 10 which acts as the outer connecting part. As a result, the EL element of the present invention can have its tail portion and easy to be coupled with the electronic device.

In addition, according to the EL element of the present invention, second insulating layer 14 covers an upper surface of shielding layer 12, so that second insulating layer 14 acts as a protective film for preventing shielding layer 12 from being damaged, while the EL element is conveyed or mounted at the electronic device. Besides, by using second insulating layer 14, the EL element can be electrically insulated from other electronic components in the electronic device.

As discussed above, according to the present invention, the hole is formed at a peripheral part of insulating layer 11. In addition, connecting portion 13, where electric conductors such as silver or carbon are dispersed in the resin, is formed in the hole so as to through-hole couple light-transmitting electrode layer 4 (or bus electrode 2) with shielding layer 12.

Figure 3:
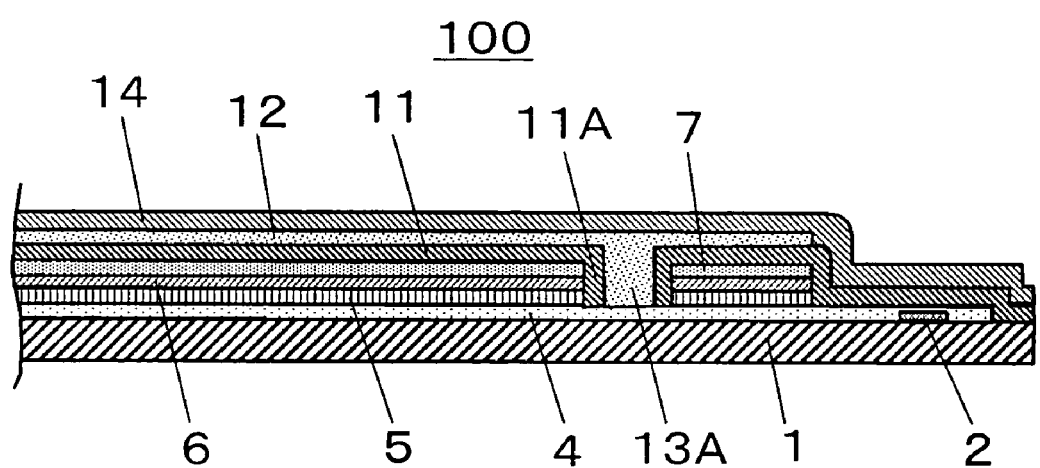
FIG. 3 is a sectional view of another EL element in accordance with the exemplary embodiment of the present invention.

However, the present invention is not limited to the structure mentioned above, and other structures may be used. For example, as shown in FIG. 3 (i.e., a sectional view of another EL element in accordance with the exemplary embodiment of the present invention), a hole may be formed in insulating layer 11 so as to penetrate to light emitting layer 5, dielectric layer 6 and backside electrode layer 7. Then an inner periphery of the hole may be covered with insulating material which is substantially the same material as insulating layer 11. After that, a connecting portion 13A, where electric conductors such as silver or carbon are dispersed in resin, may be formed in the hole, so that light-transmitting electrode layer 4 and shielding layer 12 can be coupled with each other.

Figure 4:
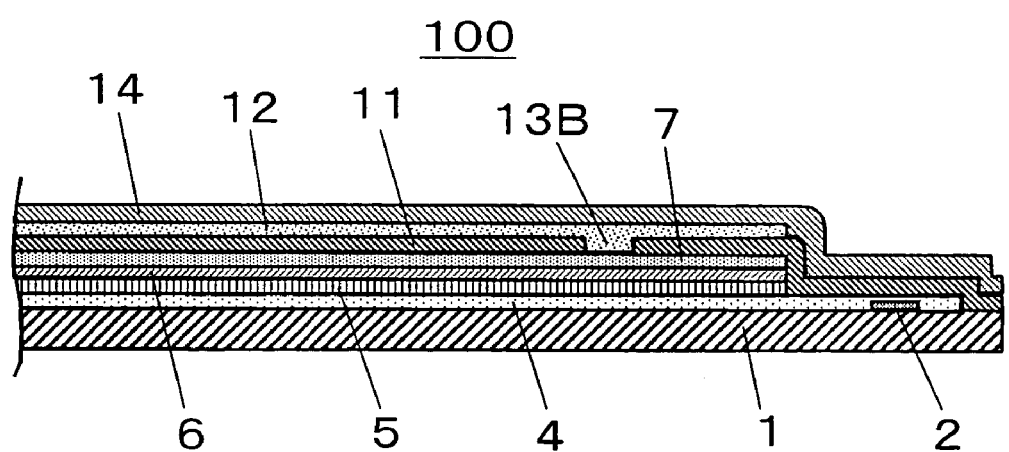
FIG. 4 is a sectional view of still another EL element in accordance with the exemplary embodiment of the present invention.

In addition, according to the present embodiment, light-transmitting electrode layer 4 (or bus electrode 2) and shielding layer 12, which is connected with layer 4 via connecting portion 13 (or connecting portion 13A), are electrically coupled with the ground terminal of the electronic device, and backside electrode layer 7 is coupled with the power source terminal. However, conversely, backside electrode layer 7 may be electrically coupled with the ground terminal, and light-transmitting electrode layer 4 may be electrically coupled with the power source terminal. In this case, as shown in FIG. 4 (i.e., a sectional view of still another EL element in accordance with the exemplary embodiment of the present invention), the hole may be formed in insulating layer 11, and connecting portion 13, where electric conductors such as silver or carbon are dispersed in resin, may be formed in the hole, so that shielding layer 12 and backside electrode layer 7 may be coupled with each other.

Besides, according to the EL element of the present embodiment, bus electrode 2 is formed on the upper surface of rectangular substrate 1 so as to be adjacent to and parallel to one side of substrate 1. In addition, bus electrode 2, which is made of conductive material, is connected with light-transmitting electrode layer 4. Electrode terminal 2A extends from bus electrode 2 to tail portion 10 which acts as the outer connecting part.

Figure 5:
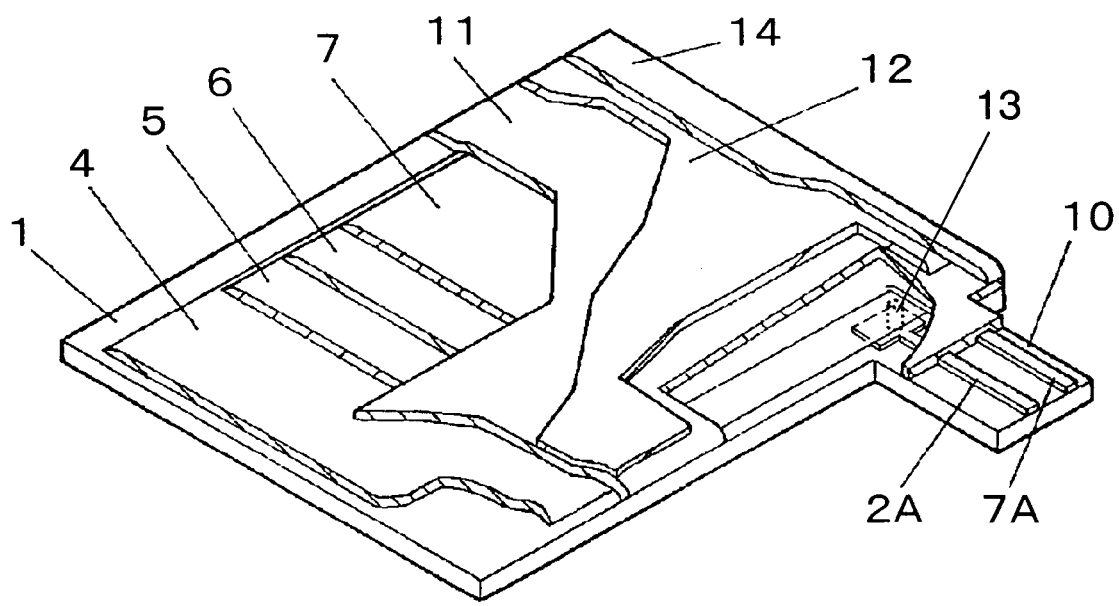
FIG. 5 is a sectional perspective view of yet another EL element in accordance with the exemplary embodiment of the present invention.
Figure 6:
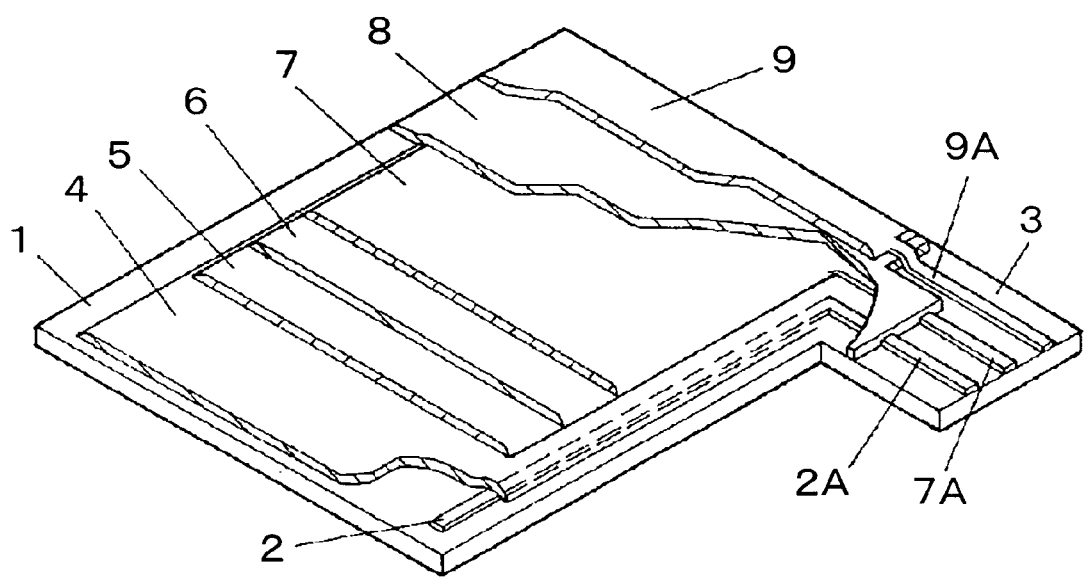
FIG. 6 is a partially cut-away perspective view of a conventional EL element.

However, as shown in FIG. 5 (i.e., a sectional perspective view of yet another EL element in accordance with the exemplary embodiment of the present invention), still another structure may be used. Bus electrode 2 may be omitted by selecting light-transmitting material as light-transmitting electrode layer 4 formed on substrate 1. In other words, electrode terminal 2A, which extends from the main part of substrate 1 to the tail portion 10, may be coupled directly with light-transmitting electrode layer 4 without forming bus electrode 2. In this case, the hole may be formed at a peripheral part of insulating layer 11. For through-hole coupling light-transmitting electrode layer 4 with shielding layer 12 at the hole, connecting portion 13, where electrical conductors such as silver or carbon are dispersed in resin, may be formed at a position near tail portion 10, which acts as the outer connecting part. Light-transmitting electrode layer 4 and electrode terminal 2A are coupled with each other at the position. According to the structure discussed above, bus electrode 2 is not necessary. Therefore, when the EL element has the same substrate size as a conventional one, an area of a luminous part can be enlarged. When the EL element has the same area of a luminous part as the conventional one, the size of the substrate or the EL element can be reduced.

As discussed above, the present invention provides an EL element which can have its tail portion of a reduced size and which can be easily coupled with the electronic device, with the tail portion acting as the outer connecting part to be coupled with the electronic device. Therefore, the EL element of the present invention can be applied to various electronic devices such as portable terminal devices.

What is claimed is:

1. An EL element comprising:
   a light-transmitting and insulating substrate having a main part and an outer connecting part protruding from said main part to allow for connection to an electronic device;
   a first electrode provided on said substrate, said first electrode including a first electrode part provided on said main part of said substrate, and a first electrode terminal extending from said first electrode part onto said outer connecting part;
   a light-transmitting electrode layer formed on said substrate and being electrically coupled with said first electrode part;
   a light emitting layer formed on said light-transmitting electrode layer;
   a dielectric layer formed on said light emitting layer;
   a backside electrode layer formed on said dielectric layer;
   a second electrode electrically coupled to said backside electrode layer, said second electrode including a second electrode terminal extending from said backside electrode layer onto said outer connecting part;
   an insulating layer formed on said backside electrode layer and on portions of said light-transmitting electrode layer not covered by at least one of said light emitting layer, said dielectric layer and said backside electrode layer; and
   a shielding layer formed on said insulating layer;
   wherein one of said light-transmitting electrode layer and said backside electrode layer is electrically coupled with said shielding layer;
   wherein at a peripheral part of said substrate, a non-luminous part is formed, said non-luminous part having no light emitting layer, no dielectric layer and no backside electrode layer formed on said substrate;
   wherein a hole is formed through said insulating layer at said non-luminous part and penetrates from said shielding layer to said light-transmitting electrode layer;
   wherein a conductive material is provided in said hole to form a connecting portion that couples said light-transmitting electrode layer with said shielding layer; and
   wherein said connecting portion and said shielding layer are formed of substantially an identical conductive material.

2. The EL element of claim 1, wherein
   said light-transmitting electrode layer is formed on said substrate so as to cover substantially all of said substrate or substantially all of said substrate except said outer connecting part.

3. The EL element of claim 1, wherein
   said outer connecting part protrudes from said main part of said substrate; and
   electrode terminals are provided on said main part of said substrate and extend from said light-transmitting electrode layer and said backside electrode layer to said outer connecting part.

4. The EL element of claim 3, wherein
   said light-transmitting electrode layer is formed on said substrate so as to cover substantially all of said substrate or substantially all of said substrate except said outer connecting part.

5. The EL element of claim 1, further comprising
   a second insulating layer covering an upper surface of said shielding layer.

6. The EL element of claim 1, wherein
   a hole is formed in said insulating layer at a luminous part at which said light emitting layer, said dielectric layer and said backside electrode layer are formed;
   said hole penetrates from said shielding layer to said backside electrode layer; and
   a conductive material is provided in said hole to form a connecting portion that couples said backside electrode layer with said shielding layer.

7. The EL element of claim 6, wherein
   said connecting portion and said shielding layer are formed of substantially an identical conductive material.

8. The EL element of claim 6, wherein
   said outer connecting part protrudes from said main part of said substrate; and
   electrode terminals are provided on said main part of said substrate and extend from said light-transmitting electrode layer and said backside electrode layer to said outer connecting part.

9. The EL element of claim 6, further comprising
   a second insulating layer covering an upper surface of said shielding layer.

10. The EL element of claim 6, wherein
    said light-transmitting electrode layer is formed on said substrate so as to cover substantially all of said substrate or substantially all of said substrate except said outer connecting part.

11. The EL element of claim 1, wherein
    said outer connecting part protrudes from said main part of said substrate; and
    electrode terminals are provided on said main part of said substrate and extend from said light-transmitting electrode layer and said backside electrode layer to said outer connecting part.

12. The EL element of claim 11, further comprising
    a second insulating layer covering an upper surface of said shielding layer.

13. The EL element of claim 1, further comprising
    a second insulating layer covering an upper surface of said shielding layer.

14. An EL element comprising:
    a light-transmitting and insulating substrate having a main part and an outer connecting part protruding from said main part to allow for connection to an electronic device;
    a first electrode provided on said substrate, said first electrode including a first electrode part provided on said main part of said substrate, and a first electrode terminal extending from said first electrode part onto said outer connecting part;
    a light-transmitting electrode layer formed on said substrate and being electrically coupled with said first electrode part;

a light emitting layer formed on said light-transmitting electrode layer;

a dielectric layer formed on said light emitting layer;

a backside electrode layer formed on said dielectric layer;

a second electrode electrically coupled to said backside electrode layer, said second electrode including a second electrode terminal extending from said backside electrode layer onto said outer connecting part;

an insulating layer formed on said backside electrode layer and on portions of said light-transmitting electrode layer not covered by at least one of said light emitting layer, said dielectric layer and said backside electrode layer; and a shielding layer formed on said insulating layer;

wherein one of said light-transmitting electrode layer and said backside electrode layer is electrically coupled with said shielding layer;

wherein a hole is formed in said insulating layer at a luminous part at which said light emitting layer, said dielectric layer and said backside electrode layer are formed;

wherein said hole penetrates from said shielding layer to said light-transmitting electrode layer, and an inner periphery of said hole is covered with an insulating material; and wherein a conductive material is provided in said hole to form a connecting portion that couples said light-transmitting electrode layer with said shielding layer.

15. The EL element of claim 14, wherein said connecting portion and said shielding layer are formed of substantially an identical conductive material.

16. The EL element of claim 14, wherein said outer connecting part protrudes from said main part of said substrate; and electrode terminals are provided on said main part of said substrate and extend from said light-transmitting electrode layer and said backside electrode layer to said outer connecting part.

17. The EL element of claim 14, further comprising a second insulating layer covering an upper surface of said shielding layer.

18. The EL element of claim 14, wherein said light-transmitting electrode layer is formed on said substrate so as to cover substantially all of said substrate or substantially all of said substrate except said outer connecting part.

* * * * *